Aug. 25, 1925.

C. J. FECHHEIMER 1,551,294

PHASE BALANCING SYSTEM

Filed Jan. 24, 1921

WITNESSES:
H. J. Shelhamer
O. B. Buchanan

INVENTOR
Carl J. Fechheimer
BY
Wesley G. Carr
ATTORNEY

Patented Aug. 25, 1925.

1,551,294

UNITED STATES PATENT OFFICE.

CARL J. FECHHEIMER, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed January 24, 1921. Serial No. 439,389.

*To all whom it may concern:*

Be it known that I, CARL J. FECHHEIMER, a citizen of the United States, and a resident of Pittsburgh, in the county of Allegheny and State of Pennsylvania, have invented a new and useful Improvement in Phase-Balancing Systems, of which the following is a specification.

My invention relates to phase-balancing systems, and it has for one of its objects to provide apparatus of the character designated that shall be sensitive and effective in detecting and correcting unbalanced conditions in a polyphase system.

In certain respects, my invention is an improvement upon a well-known type of phase balancer system in which an unbalanced polyphase line is brought into balanced condition by means of a shunt-connected synchronous machine, having, in series with its primary winding, a booster supplying backward-phase-sequence electromotive forces of proper phase and magnitude to counteract the impedance of the balancer to the balancing currents. As a result, the balancer circuit is caused to offer, in effect, zero impedance to symmetrical negative-phase-sequence components of currents, and the line voltages are perfectly balanced.

Another object of my invention is to produce a novel form of device for indicating the phase of the symmetrical backwardly rotating components of currents and for controlling the phase of the generated electromotive forces of the booster.

Systems of the type above mentioned severally embody at least two Tirrill regulators for controlling the phase and magnitude of the booster electromotive forces.

A further object of my invention is to effect the control of the booster electromotive forces without the use of a Tirrill regulator, or at least, with the use of only one such regulator.

Furthermore, the above mentioned system of control is dependent upon differences in voltages between the various phases. It is obvious that the comparatively small differences in voltages between phases may be accompanied by a very considerable unbalance in the line currents.

A further object of my invention, therefore, is to secure a much higher degree of sensitivity than is possible with voltage-responsive devices alone.

Figure 1:
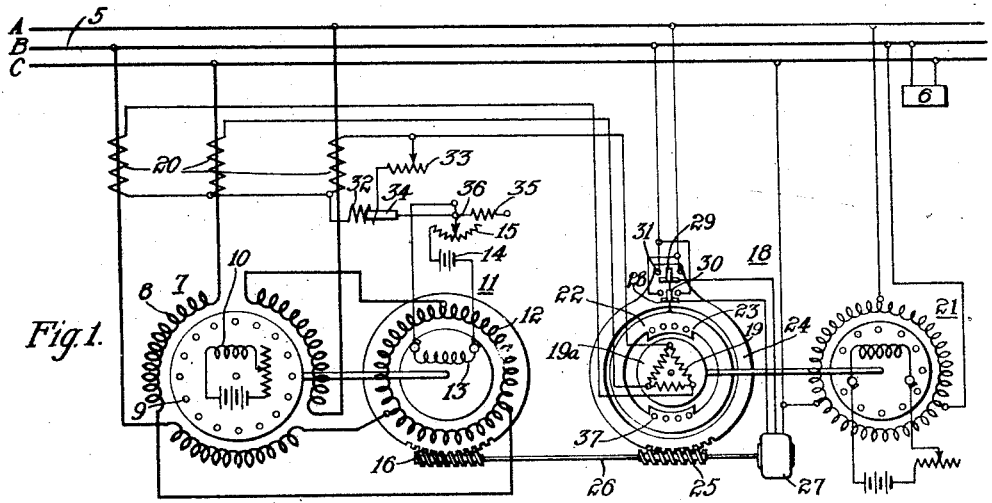
Figure 2:
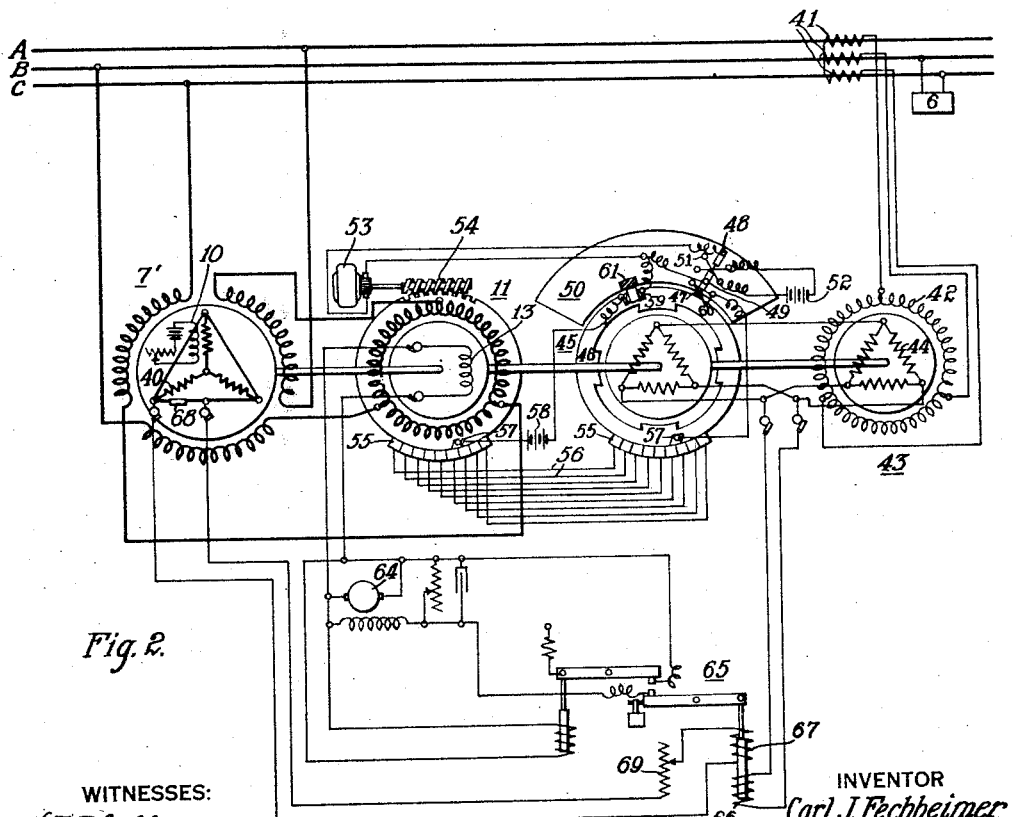

Other objects of my invention relate to economy and simplicity of construction and reliability of operation, and will be apparent from the following description and from the accompanying drawing, wherein Figure 1 is a diagrammatic view of a set of dynamo-electric machines, together with associated supply and control circuits and auxiliary apparatus, embodying one form of my invention, and Fig. 2 is a similar view of a modification.

Referring to the drawing for a more detailed understanding of my invention, I show the conductors of a three-phase system at 5, the phases being indicated as A, B and C. The system is subject to unbalanced conditions, as exemplified in the single-phase load 6.

A main balancing machine is shown at 7, having a phase-wound primary member 8 which is connected in shunt across the line 5. The phase balancer 7 is shown as having a squirrel-cage secondary member 9 and a direct-current winding 10.

The primary winding 8 of the phase balancer is connected in series with the stator 12 of a booster 11 which has a direct-current winding 13 adapted to be variably energized by means of a battery 14 and a rheostat 15. The excitation of the booster machine is variable for the purpose of adjusting the magnitude of the booster electromotive forces, the phase of these electromotive forces being adjusted by mounting the stator in an oscillating cradle the angular position of which is determined by means of a worm 16, or by any equivalent means known in the art.

It is understood, of course, that the booster stator 12 is so connected to the balancer 7 as to generate electromotive forces in the backward or reverse-phase sequence. It is necessary that the booster electromotive forces shall be displaced substantially 180 degrees from the impedance drop of the balancing current in the main balancing machine 7. These drops, however, have a substantially constant lagging phase angle with respect to the said balancing currents. After the initial adjustment, therefore, it is necessary only to adjust the relative positions of the stator and rotor of the booster 11 in accordance with the phase of the balancing currents in the main machine 7.

The means shown in Fig. 1, for indicating the phase relationship of the balancing currents, comprises a small synchronous phase-indicator machine 18 having a polyphase primary winding 19 which is energized from a series transformer 20 placed in the circuit of the main machine 7. The primary winding 19 is shown as being mounted upon the rotor member 19a of the phase indicator 18, and the rotor 19a is driven at synchronous speed by any suitable means, such as a small synchronous motor 21.

It is well known that the balancing currents of the balancer 7 are symmetrical negative-phase-sequence currents. Consequently, the direction of rotation of the rotor 19a is so chosen that the rotating field set up by the backward-phase-sequence-component currents in the winding 19 remains stationary in space.

The stator member 22 of the phase-indicator 18 is free to rotate, and is provided with salient pole-pieces 23, whereby it will take up a position corresponding to the position in space of the sationary field set up in the rotor member 19. It is obvious, of course, that, instead of having its field member provided with salient pole-pieces, the phase-indicator 18 may be excited by direct current, or a direct-current excitation may be added to the salient pole-pieces to ensure that the machine shall not skip a pole.

It is of course understood that the phase of the negative-phase-sequence booster currents is a relative term. The "phase" has been defined by Steinmetz as the angular position, with respect to a datum position, of a periodic function at a given time. In the particular embodiment shown in this application, the datum position is the position of the positive-phase-sequence line voltage, which determines the angular position of the rotor of the small synchronous motor 21, but it is obvious that any datum position may be chosen.

Any suitable means may be provided for causing the stator of the booster 11 to take up a position corresponding to the indicated phase of the negative-phase-sequence currents in the machine 18. As one means for accomplishing the desired result, I show in Fig. 1, an auxiliary, freely rotatable worm-wheel 24, placed outside of the field member 22. The angular position of the worm-wheel 24 is controlled by means of worms 25 mounted upon the same shaft 26 as the worm 16 which controls the position of the stator member of the booster 11. The shaft 26 is adapted to be driven by a motor 27.

The auxiliary machine 18 is adapted to control the operation of the motor 27 in order to cause the gear-wheel 24 and the stator member of the booster 11 to follow the movements of the field member 22. To this end, the field member 22 carries a pointer 28 having contact members 29 and 30 which co-operate with suitable contact members, indicated generically at 31, on the gear-wheel 24. The contact members just described are adapted to energize the motor 27 in the one or the other direction, according to the direction of movement of the field member 22.

It is understood, of course, that the relative angular positions of the rotor and stator members of the four machines are so chosen, initially, that the booster electromotive forces will be in the proper phase, as above described. If necessary, a very small supplemental adjustment of the relative angular positions of the two shafts may be effected by means of the field rheostats of the unidirectional-current exciting windings of the main balancer 7 and the synchronous motor 21.

In operation, the primary member 19 of the phase indicator 18 may carry currents having symmetrical balanced components of both phase sequences. It is understood that the field set up by the negative-phase-sequence currents rotates with respect to the rotor in a direction opposite to the rotation of the rotor, whereby said field remains stationary in space, except upon a change in the character of unbalance of the system, such as would be produced by changing the single-phase load from one phase to another. However, the positive-phase-sequence components, if present, will set up a field rotating at double synchronous speed, and, if necessary, a damper winding 37 may be added to the field member 22 to damp out this field. The phase indicator 18 is thus a phase-sequence-selective means, by which is meant a means responsive to balanced polyphase quantities of only one phase sequence.

The magnitude of the booster electromotive forces may be controlled automatically by any suitable means. I have indicated, by way of illustration, a coil 32 connected across one of the phases of the series transformer 20, through an adjusting impedance 33. The coil 32 is adapted to move a core member 34 against the tension of a spring 35, in order to adjust the pointer 36 of the field rheostat 15.

I have indicated the booster 11 as being mounted upon the same shaft as the balancer 7, to be driven thereby. This will cause the balancer 7 to draw a positive-phase-sequence current sufficient to supply the energy necessary to drive the booster 11, as well as the no-load losses of the main machine 7. It is presumed, however, that the negative-phase-sequence balancing component will be large, as compared with the forwardly rotating component, so that the coil 32 will be substantially responsive to the negative phase-sequence component alone.

However, it is within the purview of my invention to drive the booster 11 separately, or to drive the main machine 7 separately, in order that even the friction losses of the latter shall be taken up by external means, and, consequently, no positive-phase-sequence current will be permitted to flow through the machine 7. One method of accomplishing the last-mentioned result is to mount all four machines on the same shaft and to adjust the stator of the synchronous motor 21 in such manner that the motor will assume the entire load.

Turning to the form of invention shown in Fig. 2, the phase balancer 7' is similar to the machine shown in Fig. 1, except that the squirrel-cage winding 9 is omitted, and a close-circuited phase winding 40 is substituted therefor, for a purpose which will be explained hereinafter. The booster machine 11 is similar to the machine shown in Fig. 1, except in regard to the manner of controlling the phase position of the stator, and the energization of the excitation winding.

The means for securing the desired angular position of the stator of the booster 11 is shown, in Fig. 2, as comprising current transformers 41, placed in series with the line, and connected to the polyphase stator member 42 of the auxiliary machine 43. The rotor of the machine 43 is driven at synchronous speed, and may be mounted on the same shaft as the main machine 7'.

The connections of the primary member 42 are such that the rotating field set up by the positive-phase-sequence components rotates synchronously with the rotor, while the rotating field set up by the negative-phase-sequence components rotates at a 200 per cent slip with respect to the rotor. The rotor carries a polyphase winding 44, in which is generated a double-frequency electromotive force proportional to the magnitude of the negative-phase-sequence components of the line current. The machine 43 is specifically claimed in a Patent No. 1,535,593, issued April 28, 1925, to Charles Le G. Fortescue and others, on an application Serial No. 358,373, filed February 13, 1920, and assigned to the Westinghouse Electric & Manufacturing Company.

The double-frequency currents induced in the windings 44 are fed into the rotor member of a phase-indicating machine 45. The latter is similar in all respects to the machine 18 of Fig. 1, except that its field member 46 must have twice as many poles as the field member 22, owing to the fact that the rotor currents are of double frequency.

Fig. 2 also shows a modification in the means for effecting corresponding angular movements of the field member of the phase indicator and the stator member of the booster 11. The field member 46 carries a pointer 47 having contact members 48 and 49 which co-operate with suitable contact members placed on a freely moving frame member 50. Four contact members 51 on said member 50 are connected to a suitable source, such as a battery 52, and are adapted to co-operate with the contact members 48 and 49 to energize the motor 53 in a forward or backward direction, according to the movement of the field member 46. The motor 53 operates a worm 54 to rotate the stator of the booster 11.

The freely moving frame member 50 is adapted to be carried along with the field member 46 when the contact members 48 and 49 engage with the contact members 51. It is necessary, therefore, to provide means for restoring the frame member 50 to neutral position with respect to the field member 46 as soon as the stator of the booster 11 has caught up with the movement of said field member 46.

I have, therefore, provided a plurality of corresponding commutator segments 55 on both the field member 46 of the phase indicator and the stator member of the booster 11. Corresponding segments 55 on the two machines are connected together by means of conductors 56. I have also provided brushes 57, which are adapted to engage said segments 55. An electrical connection is established between the brushes, through conductors 56, when the brushes rest on corresponding segments 55.

The above described brush circuit is in series with any suitable source, such as a battery 58, and is also in series with a magnet 59 and with a switching means comprising the hereinbefore-mentioned contact member 49, which is carried by the field member 46, and suitable auxiliary contact members 60 which are carried by the frame member 50. By means of the connections just described, the magnet 59 is energized as soon as the stator of the booster 11 overtakes the field member 46. The magnet is mounted on the field-frame 46 and, when it is energized, it attracts an armature member 61 which is mounted on the frame member 50, thereby drawing said frame member into neutral position and disengaging the contact members 48 and 49 from the co-operating contact members 51 and 60.

A modification of the booster-voltage-controlling means is also shown in Fig. 2. The direct-current winding 13 of the booster is excited by means of a shunt-wound exciter 64 the voltage of which is controlled by means of a Tirrill regulator 65. The regulating means for the Tirrill regulator consists of a pair of differentially wound actuating coils 66 and 67 which are energized, respectively, from one of the phases of the secondary member 44 and from one of the phases of the secondary member 40. The secondary member 44 carries double-frequency currents that are proportional to the magnitude of the negative-phase-sequence components of the line currents, as previously pointed out, while the secondary winding 40, in a similar way, carries double-frequency currents that are proportional to the negative-phase-sequence components of the currents in the balancer.

The secondary winding 40 of the balancer is shown as being short-circuited in all three phases, in order to constitute a good damper winding. The current for the coil 67 is obtained from a shunt 68, connected in one of the phases. A regulating impedance 69 is shown in series with the coil 67, to provide for the necessary adjustment, whereby the negative-phase-sequence currents in the balancer may be made equal to the negative-phase-sequence currents in the line.

While I have shown my phase indicators 18 and 45 in preferred form, in which the member which carries the phase-indicating device is normally stationary, I wish it to be understood that it may be desirable, under certain circumstances, to interchange the stator and rotor members of the phase indicator.

The operation of the device may be summarized as follows: Referring to the modification shown in Fig. 2, let it be assumed that the unbalanced currents carried by the polyphase line A—B—C becomes changed, both in phase and magnitude. The change in phase will produce a corresponding change in phase in the rotating field set up in the primary winding 42 of the auxiliary machine 43. By virtue of the magnetic coupling between the primary and secondary members of the auxiliary machine, the above mentioned change in phase will be reflected also into the rotor member of the phase indicator 45. The angular position of the field member of the balancer will then be similarly varied, in the manner already described.

The change in the magnitude of the unbalanced currents will produce a corresponding change in the magnitude of the double-frequency currents in the rotor winding 44 of the auxiliary machine 43 and also in the excitation of the actuating coil 66 of the Tirrill regulator 65. The increased unbalanced currents in the line will produce an increase in the voltage unbalance of the line, and hence, the main balancing machine 7 will inherently draw larger unbalanced currents, as a result of the increase in the unbalanced line currents.

However, by reason of the fact that the impedance offered by the balancer to the augmented currents is not altogether neutralized by the booster electromotive force, the increase in the primary currents drawn by the phase balancer will not be as great as the increase in the unbalancing currents flowing in the line. The increase in the primary currents of the phase balancer will appear in the secondary winding as a double-frequency electromotive force and will produce a corresponding change in the excitation of the actuating coil 67 of the Tirrill regulator 65. Since the coils 67 and 66 are in opposition, the coil 66 will momentarily prevail, thereby increasing the voltage of the exciter 64.

In Fig. 2, I have shown all four machines mounted on the same shaft, with the losses supplied by the main balancer 7. However, this load could be taken off the machine 7 by means of an additional driving machine. It is also possible for the machines to be separately driven, as mentioned in connection with the embodiment of my invention shown in Fig. 1.

While I have described the invention in connection with a three-phase system, it is, of course, understood that the method is applicable to any polyphase system. In like manner, the series transformers, or inductive series connections, are understood to be the equivalents of conductive series connections for the machines 18 and 43. Other changes will, of course, be obvious to those skilled in the art, and, while I have shown my invention in what appears to be preferred forms, I wish it understood that I do not consider the invention limited to the specific disclosure except as may be expressly stated in the claims.

I claim as my invention:

1. The combination with a polyphase system which is subject to unbalanced conditions, of balancing means therefor, said means including a booster machine, means for automatically varying the magnitude of the booster electromotive forces in accordance with the magnitude of the symmetrical backward-phase-sequence components of the currents in said polyphase system, and means for automatically varying the phase of the booster electromotive forces in accordance with the variations in the phase of said backward-phase-sequence components.

2. The combination with a polyphase system which is subject to unbalanced conditions, of balancing means therefor, said means including a booster machine, and serially connected means responsive directly to the negative-phase-sequence component currents in said system for controlling said booster electromotive forces.

3. The combination with a polyphase system which is subject to unbalanced conditions, of a dynamo-electric phase balancer connected across said system, a booster machine connected in series-circuit relationship with said balancer for neutralizing the impedance thereof to backward-phase-sequence component currents, means for varying the magnitude of the booster electromotive forces in accordance with the magnitude of the symmetrical backward-phase-sequence components of the currents in said polyphase system, and means for varying the phase of the booster electromotive forces in accordance with the variations in the phase of said backward-phase-sequence components.

4. The combination with a polyphase system which is subject to unbalanced conditions, of a dynamo-electric phase balancer connected across said system, a booster machine connected in series-circuit relationship with said balancer for neutralizing the impedance thereof to backward-phase-sequence component currents, and means responsive to the symmetrical backward-phase-sequence component currents in said system and to the symmetrical backward-phase-sequence component currents in said phase balancer for maintaining said component currents equal in magnitude.

5. The combination with a polyphase system which is subject to unbalanced conditions, of a dynamo-electric phase balancer connected across said system, a booster machine connected in series-circuit relationship with said balancer for neutralizing the impedance thereof to backward-phase-sequence component currents, and current-responsive means for controlling the magnitude of said booster electromotive forces, said current-responsive means including symmetrical polyphase apparatus connected across said system and means responsive to the backward-phase-sequence currents flowing in said apparatus.

6. The combination with a polyphase system which is subject to unbalanced conditions, of a dynamo-electric phase balancer connected across said system, a booster machine connected in series-circuit relationship with said balancer for neutralizing the impedance thereof to backward-phase-sequence component currents, and current-responsive means for controlling the phase of said booster electromotive forces, said current-responsive means comprising symmetrical polyphase apparatus connected across said system, and means responsive to the phase position of the backward-phase-sequence currents flowing in said apparatus for controlling the angular position of the field poles of said booster machine.

7. The combination with a polyphase system which is subject to unbalanced conditions, of a dynamo-electric phase balancer connected across said system, a booster machine connected in series-circuit relationship with said balancer for neutralizing the impedance thereof to backward-phase-sequence component currents, means responsive to the currents flowing in said phase balancer for varying the booster excitation, and means responsive to the phase of the negative-phase-sequence currents for controlling the position of the field poles of said booster machine.

8. A device for detecting the nature of the unbalanced condition of a polyphase system comprising a rotor member rotating at synchronous speed with respect to said system, a polyphase winding mounted upon said rotor member and so connected to said system that the field of the symmetrical component currents of a given phase sequence tends to remain fixed in space except upon a change in the character of the unbalanced condition of said system, and means responsive to the position of said field.

9. A device for detecting the nature of the unbalanced condition of a polyphase system comprising a rotor member rotating at synchronous speed with respect to said system, a polyphase winding mounted upon said rotor member and so connected to said system that the field of the symmetrical component currents of backward phase sequence tends to remain fixed in space except upon a change in the character of the unbalanced condition of said system, and a rotatably mounted stator member disposed adjacent said rotor and having salient pole-pieces which tend to lock with said field.

10. A device for detecting the nature of the unbalanced condition of a polyphase system comprising a rotor member rotating at synchronous speed with respect to said system, a polyphase winding mounted upon said rotor member and so connected to said system that the field of the symmetrical component currents of backward-phase-sequence tends to remain fixed in space except upon a change in the character of the unbalanced condition of said system, and a rotatably mounted stator member disposed adjacent said rotor and having means for causing it to adjust its position with that of said field.

11. Synchronizing apparatus comprising a member free to move in either direction, a similar member requiring to be moved in substantial synchronism with said first-mentioned member, motor means for moving said second member in either direction, controlling means for said motor means, said controlling means comprising a freely movable member mounted upon said first-mentioned member, means whereby movement of said first mentioned member in either direction causes a mechanical engagement with said freely movable member and energizes said motor means in the corresponding direction, and means for de-energizing said motor means when said second-mentioned member has caught up in position with said first mentioned member.

12. In a device for detecting the nature of unbalanced conditions in a polyphase system, the combination with a rotor member driven at synchronous speed with respect to said system, of polyphase means energized from said system for producing a magnetic field in said rotor member, said magnetic field having a phase rotation opposite to that of said rotor member, whereby said magnetic field tends to remain fixed in space except upon a change in the character of the unbalanced conditions of said system, and means responsive to said field shift to correct the unbalanced conditions of said system.

13. In a device for detecting the nature of unbalanced conditions in a polyphase system, the combination with a rotor member driven at synchronous speed with respect to said system, of polyphase means responsive to a negative-phase-sequence component of an electrical quantity in said system for producing a magnetic field in said rotor member, said magnetic field having a phase rotation opposite to that of said rotor member, whereby said magnetic field tends to remain fixed in space except upon a change in the character of the unbalanced conditions of said system, a rotatably mounted stator member disposed adjacent said rotor member and having means which tend to lock with said field, and corrective means actuated by the movement of said stator member to compensate for the unbalanced conditions of said system.

14. In a device for detecting the nature of unbalanced conditions in a polyphase system, the combination with a rotor member driven at synchronous speed with respect to said system, of polyphase means responsive to a negative-phase-sequence component of an electrical quantity in said system for producing a magnetic field in said rotor member, said magnetic field having a phase rotation opposite to that of said rotor member, whereby said magnetic field tends to remain fixed in space except upon a change in the character of the unbalanced conditions of said system, a rotatably mounted stator member tending to lock in a fixed position with relation to said field, a phase-balancer connected to said system, a booster machine for supplying negative-phase-sequence electromotive forces to said phase-balancer circuit, and means whereby the alteration in the position of said stator member, upon a change in the character of the unbalanced conditions, is operative to change the phase of the electromotive forces of said booster machine.

15. In a phase-balancing system, the combination with a polyphase line subject to unbalancing polyphase electromotive forces, of means adapted to neutralize said unbalancing polyphase electromotive forces, said means comprising a machine having a stator member mounted for rotative adjustment and a rotor member driven at synchronous speed with respect to said polyphase line, one of said members being polarized and the other carrying a generating winding, and means responsive to the phase of a negative-phase-sequence electrical quantity and substantially unaffected by any positive-phase-sequence quantities for shifting the angular position of said stator member upon a change in the character of unbalance in said polyphase line, whereby the phase of the output electromotive forces of said machine is automatically adjusted.

16. In apparatus for the correction of unbalanced conditions in a polyphase supply system, the combination with a machine comprising a direct-current field winding and a relatively synchronously rotating polyphase generating winding, of means for automatically shifting the angular position of the magnetic poles of said field member upon a change in the character of the unbalanced conditions in said system, said means comprising apparatus for producing a field fixed in space and having a position corresponding to the character of said unbalanced conditions, and means responsive to shifts in the position of said last-mentioned field for controlling said pole-shifting means.

17. In apparatus for the correction of unbalanced conditions in a polyphase supply system, the combination with a machine comprising a stator member and a rotor member driven at synchronous speed with respect to said supply system, one of said members carrying a direct-current field winding, and the other carrying a polyphase, negative-phase-sequence generating winding, of means for automatically shifting the angular position of the magnetic poles of said field member upon a change in the character of the unbalanced conditions in said system, said means comprising a rotor member driven at synchronous speed with respect to said system, means responsive to a negative-phase-sequence component of an electrical quantity in said system for producing polyphase magnetomotive forces in said rotor member, the phase-sequence of said magnetomotive forces being opposite to the direction of mechanical rotation, whereby a magnetic field is established tending to be fixed in space except upon an alteration in the character of said unbalanced conditions, and means responsive to a shift in the axis of said fixed magnetic field for controlling said pole-shifting means.

18. In apparatus for the correction of unbalanced conditions in a polyphase supply system, the combination with a dynamo-electric machine comprising a stator member mounted for rotation and a rotor member driven at synchronous speed with respect to said supply system, one of said members being polarized and the other carrying a generating winding, of means for shifting the position of said stator member upon a change in the character of the unbalanced conditions in said system, said means comprising a rotor member driven at synchronous speed with respect to said system, means responsive to a negative-phase-sequence component of an electrical quantity in said system for producing polyphase magnetomotive forces in said rotor member, the phase-sequence of said magnetomotive forces being opposite to the direction of mechanical rotation, whereby a magnetic field is established tending to be fixed in space except upon an alteration in the character of said unbalanced conditions, a rotatably mounted stator member mounted adjacent said rotor and provided with means for establishing magnetic poles which tend to lock with said field, and means whereby the rotative movement of said last-mentioned stator member produces a corresponding movement of the stator member of said dynamo-electric machine.

19. The combination with a polyphase line subject to unbalanced conditions, of a polyphase dynamo-electric machine having its primary winding connected across said line, means for deriving an electromotive force proportional to the backward-phase-sequence component currents flowing in said primary winding, and means responsive to said derived electromotive force for inducing backward-phase-sequence component electromotive forces in series with said primary winding.

20. The combination with a polyphase line subject to unbalanced conditions, of a polyphase dynamo-electric machine having its primary winding connected across said line, an auxiliary source of backward-phase-sequence electromotive forces connected in series with said primary winding, and serially connected means responsive directly to the phase-angle of the backward-phase-sequence component currents in said machine for varying the phase-angle of the electromotive forces of said auxiliary source.

21. The combination with a polyphase line subject to unbalanced conditions, of a polyphase dynamo-electric machine having its primary winding connected across said line, an auxiliary source of backward-phase-sequence electromotive forces connected in series with said primary winding, and a phase-indicator responsive to backward-phase-sequence currents for varying the phase-angle of the electromotive forces of said auxiliary source.

22. The combination with a polyphase line which is subject to unbalanced conditions, of a shunt balancer, an auxiliary source of negative-phase-sequence electromotive forces connected in series with said balancer, and means responsive to the ratio of the negative-phase-sequence currents in said balancer to the negative-phase-sequence currents in said line for adjusting the electromotive forces of said auxiliary source.

23. A device for detecting the nature of the unbalanced condition of a polyphase system, comprising a detector-member-carrying means for establishing magnetic poles therein, a relatively rotatable member rotating at synchronous speed with respect to said detector member, a polyphase winding mounted upon said relatively rotatable member and means for so energizing said polyphase winding from said system that the field of the symmetrical component currents of a given phase-sequence tends to remain fixed in space with respect to said detector member except upon a change in the character of the unbalanced condition of said system.

24. The combination with a polyphase system which is subject to unbalanced conditions, of balancing means therefor, said means including a booster machine, phase-sequence selective means for indicating a condition of a negative-phase-sequence electrical quantity in said system, and means whereby the electromotive forces of said booster may be adjusted.

25. The combination with a polyphase system which is subject to unbalanced conditions, of balancing means therefor, said means including a booster machine, phase-sequence responsive means for indicating the phase of a negative-phase-sequence electrical quantity in said system, and means whereby the electromotive forces of said booster may be adjusted in phase.

26. The combination with a polyphase system which is subject to unbalanced conditions, of balancing means therefor, said means including a booster machine, phase-sequence responsive means for indicating the magnitude of a negative-phase-sequence electrical quantity in said system, and means whereby the electromotive forces of said booster may be adjusted in magnitude.

27. The combination with a polyphase system which is subject to unbalanced conditions, of balancing means therefor, said means including a booster machine, phase-sequence responsive means for indicating the phase and magnitude of a negative-phase-sequence electrical quantity in said system, and means whereby the electromotive forces of said booster may be adjusted in phase and magnitude.

28. The combination with a polyphase system which is subject to unbalanced conditions, of balancing means therefor, said means including a booster machine, and phase-sequence selective means responsive to a condition of a negative-phase-sequence electrical quantity in said system for automatically adjusting the electromotive forces of said booster.

29. The combination with a polyphase system which is subject to unbalanced conditions, of balancing means therefor, said means including a booster machine, and phase-sequence selective means responsive to the phase of a negative-phase-sequence electrical quantity in said system for automatically adjusting the phase of the electromotive forces of said booster.

30. The combination with a polyphase system which is subject to unbalanced conditions, of balancing means therefor, said means including a booster machine, and phase-sequence selective means responsive to the magnitude of a negative-phase-sequence electrical quantity in said system for automatically adjusting the magnitude of the electromotive forces of said booster.

31. The combination with a polyphase system which is subject to unbalanced conditions, of balancing means therefor, said means including a booster machine, and phase-sequence selective means responsive to the phase and magnitude of a negative-phase-sequence electrical quantity in said system for automatically adjusting the phase and magnitude of the electromotive forces of said booster.

32. The combination with a polyphase system which is subject to unbalanced conditions, of balancing means therefor, said means including a booster machine, and phase-sequence selective means responsive to the phase but not the magnitude of a negative-phase-sequence electrical quantity in said system for automatically adjusting the phase of the electromotive forces of said booster, without substantially changing their magnitude.

33. The combination with a polyphase system which is subject to unbalanced conditions, of balancing means therefor, said means including a booster machine, and phase-sequence selective means responsive to the magnitude but not the phase of a negative-phase-sequence electrical quantity in said system for automatically adjusting the magnitude of the electromotive forces of said booster without substantially changing their phase.

34. The combination with a polyphase system which is subject to unbalanced conditions, of balancing means therefor, said means including a booster machine, phase-sequence selective means responsive to the phase but not the magnitude of a negative-phase-sequence electrical quantity in said system for automatically adjusting the phase of the electromotive forces of said booster without substantially changing their magnitude, and phase-sequence selective means responsive to the magnitude but not the phase of a negative-phase-sequence electrical quantity in said system for automatically adjusting the magnitude of the electromotive forces of said booster without substantially changing their magnitude.

35. The combination with a source of substantially balanced polyphase voltages, a polyphase line supplied thereby and an unbalanced load connected to said line, of balancing means comprising a phase balancer and a series booster connected across said line, phase-sequence responsive means for indicating a condition of the negative-phase-sequence current components flowing in said line toward said unbalanced load, and means whereby the electromotive forces of said booster may be adjusted.

36. The combination with a source of substantially balanced polyphase voltages, a polyphase line supplied thereby and an unbalanced load connected to said line, of balancing means comprising a phase balancer and a series booster connected across said line, phase-sequence responsive means for indicating the phase of the negative-phase-sequence current component flowing in said line toward said unbalanced load, and means whereby the electromotive forces of said booster may be adjusted in phase.

37. The combination with a source of substantially balanced polyphase voltages, a polyphase line supplied thereby and an unbalanced load connected to said line, of balancing means comprising a phase balancer and a series booster connected across said line, phase-sequence responsive means for indicating the magnitude of the negative-phase-sequence current components flowing in said line toward said unbalanced load, and means whereby the electromotive forces of said booster may be adjusted in magnitude.

38. The combination with a source of substantially balanced polyphase voltages, a polyphase line supplied thereby and an unbalanced load connected to said line, of balancing means comprising a phase balancer and a series booster connected across said line, phase-sequence responsive means for indicating the phase and the magnitude of the negative-phase-sequence current components flowing in said line toward said unbalanced load, and means whereby the electromotive forces of said booster may be adjusted in phase and magnitude.

39. The combination with a source of substantially balanced polyphase voltages, a polyphase line supplied thereby and an unbalanced load connected to said line, of balancing means comprising a phase balancer and a series booster connected across said line, and phase-sequence selective means responsive to a condition of the negative-phase-sequence current component flowing in said line between said balancing means and said unbalanced load, for automatically adjusting the electromotive forces of said booster.

40. The combination with a source of substantially balanced polyphase voltages, a polyphase line supplied thereby and an unbalanced load connected to said line, of balancing means comprising a phase balancer and a series booster connected across said line, and phase-sequence selective means responsive to the phase of the negative-phase-sequence current component flowing in said line between said balancing means and said unbalanced load, for automatically adjusting the phase of the electromotive forces of said booster.

41. The combination with a source of substantially balanced polyphase voltages, a polyphase line supplied thereby and an unbalanced load connected to said line, of balancing means comprising a phase balancer and a series booster connected across said line, and phase-sequence selective means responsive to the magnitude of the negative-phase-sequence current components flowing in said line between said balancing means and said unbalanced load, for automatically adjusting the magnitude of the electromotive forces of said booster.

42. The combination with a source of substantially balanced polyphase voltages, a polyphase line supplied thereby and an unbalanced load connected to said line, of balancing means comprising a phase balancer and a series booster connected across said line, phase-sequence selective means responsive to the phase of the negative-phase-sequence current components flowing in said line between said balancing means and said unbalanced load, for automatically adjusting the phase of the electromotive forces of said booster, and phase-sequence selective means responsive to the magnitude of the negative-phase-sequence current components flowing in said line between said balancing means and said unbalanced load, for automatically adjusting the magnitude of the electromotive forces of said booster.

43. The combination with a source of substantially balanced polyphase voltages, a polyphase line supplied thereby and an unbalanced load connected to said line, of balancing means comprising a phase balancer and a series booster connected across said line, and phase-sequence selective means responsive to the phase but not the magnitude of the negative-phase-sequence current component flowing in said line between said balancing means and said unbalanced load, for automatically adjusting the phase of the electromotive forces of said booster without substantially changing their magnitude.

44. The combination with a source of substantially balanced polyphase voltages, a polyphase line supplied thereby and an unbalanced load connected to said line, of balancing means comprising a phase balancer and a series booster connected across said line, and phase-sequence selective means responsive to the magnitude but not the phase of the negative-phase-sequence current components flowing in said line between said balancing means and said unbalanced load, for automatically adjusting the magnitude of the electromotive forces of said booster without substantially changing their phase.

45. The combination with a source of substantially balanced polyphase voltages, a polyphase line supplied thereby and an unbalanced load connected to said line, of balancing means comprising a phase balancer and a series booster connected across said line, and phase-sequence selective means responsive to the phase but not the magnitude of the negative-phase-sequence current component flowing in said line between said balancing means and said unbalanced load, for automatically adjusting the phase of the electromotive forces of said booster without substantially changing their magnitude, and phase-sequence selective means responsive to the magnitude but not the phase of said negative-phase-sequence current component, for automatically adjusting the magnitude of the electromotive forces of said booster without substantially changing their phase.

46. The combination with a polyphase system which is subject to unbalanced conditions, of balancing means comprising a phase balancer and a series booster connected across the line, regulating means for independently varying the phase and magnitude of the booster electromotive force, and indicating means including means responsive to the current flowing in said balancing means for indicating the conditions according to which the regulating means should be adjusted.

47. The combination with a polyphase system which is subject to unbalanced conditions, of balancing means comprising a phase balancer and a series booster connected across the line, regulating means for independently varying the phase and magnitude of the booster electromotive force, and electro-responsive means including means responsive to the current flowing in said balancing means for automatically adjusting said regulating means.

In testimony whereof, I have hereunto subscribed my name this 5th day of January, 1921.

CARL J. FECHHEIMER.